(No Model.)
E. ROWLAND.
BABY CARRIAGE BRAKE.
No. 496,903. Patented May 9, 1893.
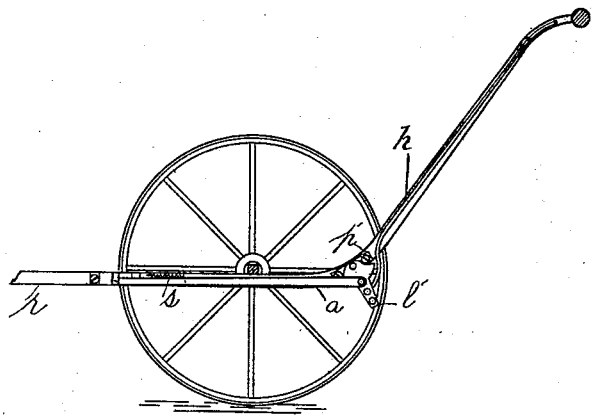
Fig-1-
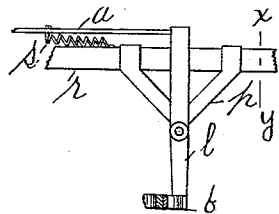 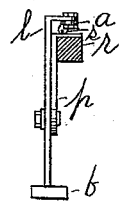 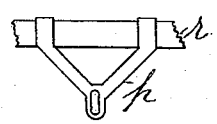 
Fig-2-  Fig-3-  Fig-4-  Fig-5-
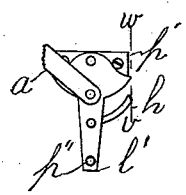 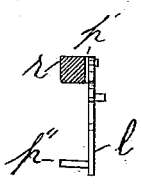 
Fig-6-  Fig-7- Fig-8-
Witnesses
C. C. Woodworth
J. R. Detchon
Inventor
Evan Rowland
By F. D. Woodworth
Attorney
THE NORRIS PETERS CO., PHOTO-LITHO., WASHINGTON, D. C.

UNITED STATES PATENT OFFICE.

EVAN ROWLAND, OF YOUNGSTOWN, OHIO.

BABY-CARRIAGE BRAKE.

SPECIFICATION forming part of Letters Patent No. 496,903, dated May 9, 1893.

Application filed September 8, 1892. Serial No. 445,309. (No model.)

*To all whom it may concern:*

Be it known that I, EVAN ROWLAND, a citizen of the United States, residing at Youngstown, in the county of Mahoning and State of Ohio, have invented certain new and useful Improvements in Baby-Carriage Brakes; and I do hereby declare the following to be a full, clear, and exact description of my invention, such as will enable others skilled in the art to which it appertains to make and use the same, reference being had to the accompanying drawings, which form part of this specification.

My invention relates to improvements in baby carriage brakes, and its object is a brake mechanism of such new combination of devices as to be at once pleasing in appearance, and more durable, convenient and effective, and less liable to injure the carriage than are other baby carriage brakes now in use. In other baby carriage brakes pressure is applied to the wheel-hub which renders them weak for lack of leverage, and greatly liable to loosen the wheel-spokes, and eventually to destroy the wheel, if made of wood. In my invention motion is checked by attrition between a brake-shoe and the wheel-tire that is equal to all points on the periphery of the wheel, which, in such carriages is usually a very imperfect circle, the shoe being actuated by a mechanism that enables the nurse to apply the brake by a slight pull of a rod, the handle end of which is found at the cross rail she is using to propel the carriage, and to open it by a slight downward pressure upon the same.

I have illustrated and shall describe my brake as applied to a baby carriage that is propelled from behind, but it may be applied to a draft baby carriage equally as well, and this may be done by any mechanic skilled in such work.

In the drawings, Figure 1 is an elevation view of a longitudinal vertical section of the rear part of the side of a baby carriage, minus the bed, that has my brake attached, and on a line immediately inward of the arm *a*. Fig. 2 is a top view, in relative positions, of a section of the wheel felly, of the brake-shoe *b*, of the support plate *p*, of the horizontal lever *l*, of the spiral spring *s*, and of sections of the carriage rail *r* and the arm *a*. Fig. 3 is a transverse section view of the same except the spring *s* on the line *x y* of Fig. 2. Fig. 4 is a top or plan view of the support plate *p*, isolated. Fig. 5 is a similar view of the horizontal lever *l* and the brake-shoe. Fig. 6 is a face view, in relative positions, of the rail plate *p'*, of the vertical lever *l'* with the terminals of the arm *a* and the handle rod *h* attached. Fig. 7 is a transverse section view of the same on the line *v w* of Fig. 6; and Fig. 8 is a side view of the higher parts of the carriage rail and handle rod.

Similar letters refer to similar parts throughout the views.

The several parts of my brake mechanism are of metal, preferably steel, as light as practical, and, except the handle-rod *h*, which is round, and the pins, bolts, and brake-shoe, which are in the usual forms of such objects, are, preferably, flat and rectangular. They may be nickel-plated, bronzed, or japanned in colors, as may be desired.

The support plate *p* is to maintain and give fulcrum by a pivot pin to the brake-lever *l*, for which purpose it is attached to the carriage rail *r*, at a proper location, and extends outward on a horizontal plane a suitable distance. It is Y formed, for greater strength of attachment to the rail *r*, the ends of the bifurcated parts, however, being upon right lines where they cross transversely the upper and inner sides of the rail *r* to which they are attached by screws, preferably driven into the inner side, the heads countersunk. In the unbifurcated portion appears a central longitudinal slot to offer means for adjusting the lever *l* by movement of the pivot pin which is a nut and bolt. For this purpose I provide a T form headed bolt in the use of which the ends of the downward projections from the head, that appear on two sides only, rest upon the plate *p* so that the bolt may be tightened rigidly in any portion of the slot, and the lever *l* remain freely movable on the pivot formed by it.

The brake-lever *l* connects the arm *a*, which appears upon the inner side of the rail *r*, and the brake-shoe *b*, being attached to the former pivotally and to the latter rigidly, such attachments being at its opposite ends, intermediate between which it has fulcrum upon the pivot pin projecting upward from the plate *p* as has been already described. Intermediate between the bifurcated parts of the plate *p* the lever *l* resting thereon crosses the rail *r* transversely, and, at a little distance beyond its inward side, it bends sharply downward so that its pivotal connection with the arm *a* is only slightly above the lower line of the rail *r*. The arm *a*, pivotally attached to both, connects the horizontal lever *l* and the vertical lever *l'*. The vertical lever *l'* has fulcrum at its forward end in a pivot pin that projects from the plate *p'*, which plate *p'* is embedded into the inner side of the carriage rail *r* immediately forward of its point of upward deflection to supply a handle for propulsion of the carriage, and is secured by screws with heads countersunk. At its rear end the vertical lever *l'* is provided with the stop-pin *p''*, and intermediately between the fulcrum and the stop-pin *p''*, the arm *a* and the handle-rod *h* are pivotally attached thereto, the latter rearward of the former, each so located that the stop-pin *p''* impinges the under side of the rail *r* when the lever *l'* is slightly forward of its fulcrum, or center of motion, thus holding it from passing over. It will be seen that by such location of the pin *p''* the brake cannot be accidentally applied by shake of the carriage, as might occur if the dead center was relied upon to hold the parts in place.

The handle rod *h* extends from its pivotal connection with the lever *l'* upward and rearward along the inner side of the rail *r*, held thereto as far as necessary by staples, and is turned at its upper end to a parallel, for a little distance, with the horizontal part of the rail *r* as shown at Fig. 8.

Between the arm *a* and the rail *r* appears, longitudinal with both, the spiral spring *s* attached at its forward end to the rail *r* and at its rear end to the arm *a*. The force of the spring *s*, when the lever *l'* is on or slightly forward of the center, maintains the brake at the open, and when off the center, as shown at Fig. 1, at the closed or applied position, and this also causes the brake-shoe *b* to hug the wheel tire with equal stress at all points, however the arc of the circle represented by the wheel may vary.

The mechanism and operation of my brake will now be readily comprehended. The nurse, with a finger, draws upward the handle rod *h*, throwing the rearward pivot of the arms slightly forward of the center of motion in the vertical lever *l'* opening the brake, and this position is maintained by the co-operation of the pin *p''* that prevents the vertical lever *l'* from turning farther forward, with the force of the spring which impels it in that direction. When she desires to apply the brake an upward pull, followed by a slight downward push throws the vertical lever *l'* below the center and brings the brake-shoe *b* against the wheel tire. I am aware that brake-shoes, levers and arms, and also spiral springs (not however to hold the brake both at the open and applied) have been used in carriage and wagon brakes, but I am not aware that the carriage brake mechanism above described was ever known until my invention thereof.

What I claim is—

In baby carriage brakes, the brake mechanism, formed, in combination with a baby carriage having rails that extend rearward and upward from the rear axle, by the horizontal lever *l*, having at its outer end the rigidly attached brake shoe *b*, and at its inner end a pivotal attachment with a rearward extending arm, while intermediately it has fulcrum in a pivot pin from the support plate *p* that extends outward from the carriage rail *r*; the arm *a* that connects the levers *l* and *l'*; the vertical lever *l'* that has fulcrum at its forward end in a pin from the plate *p'* that appears upon the inner side of the carriage rail *r*, and which lever *l'* is provided with the stop-pin *p''* at its rear end, and intermediately between its ends has pivotal connections with the arm *a* and the handle-rod *h*; and the handle-rod *h* that extends from the vertical lever *l'* upward, parallel with the prolonged portion of the carriage rail *r*, terminating in an abrupt inward bend, all substantially as described and for the purposes expressed.

In testimony whereof I hereunto affix my signature in the presence of two witnesses.

EVAN ROWLAND.

Witnesses:
 JESSIE J. WOODWORTH,
 G. W. TUCKER.